United States Patent
Agarwal et al.

(10) Patent No.: US 10,685,113 B2
(45) Date of Patent: Jun. 16, 2020

(54) DETERMINING THE SIMILARITY OF BINARY EXECUTABLES

(71) Applicant: Apple Inc., Cupertino, CA (US)

(72) Inventors: Ashish Agarwal, Sunnyvale, CA (US); Fei Peng, Santa Clara, CA (US); Zhui Deng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 15/676,329

(22) Filed: Aug. 14, 2017

(65) Prior Publication Data

US 2019/0005242 A1 Jan. 3, 2019

Related U.S. Application Data

(60) Provisional application No. 62/526,229, filed on Jun. 28, 2017.

(51) Int. Cl.
*G06F 21/56* (2013.01)

(52) U.S. Cl.
CPC .......... *G06F 21/566* (2013.01); *G06F 21/564* (2013.01); *G06F 2221/033* (2013.01)

(58) Field of Classification Search
CPC . G06F 21/566; G06F 21/564; G06F 2221/033
See application file for complete search history.

(56) References Cited

U.S. PATENT DOCUMENTS

| | | | | |
|---|---|---|---|---|
| 7,246,267 B2* | 7/2007 | Bennett | .................... | G06F 8/53 714/39 |
| 7,657,881 B2* | 2/2010 | Nagendra | .......... | G06F 9/45516 717/136 |
| 7,751,584 B2* | 7/2010 | Zimmer | ................ | G06T 1/0035 358/3.28 |
| 7,836,121 B2* | 11/2010 | Elgressy | ............... | G06F 21/445 709/203 |

(Continued)

FOREIGN PATENT DOCUMENTS

WO    WO2016/135729    9/2016

OTHER PUBLICATIONS

Panzarino, "Apple goes after clones and spam on the App Store," TechCrunch, https://techcrunch.com/2017/06/21/apple-goes-after-clones-and-spam-on-the-app-store/, Jun. 21, 2017, 3 pages.

*Primary Examiner* — J. Brant Murphy
(74) *Attorney, Agent, or Firm* — Fletcher Yoder PC

(57) ABSTRACT

In some implementations, a computing device can determine the similarity of binary executables. For example, the computing device can receive an application, including a binary executable. The computing device can generate function signatures for the functions called within the binary executable. The computing device can generate a locality sensitive hash value for the application based on the function signatures. The computing device can group applications based on the locality sensitive hash value generated for each application. The computing device can compare the function signatures of the binary executables of the applications (Continued)

within a group to determine the similarity of the applications. If two applications have binary executables that are over a threshold percentage of similarity, the two applications can be identified as clones of each other.

21 Claims, 8 Drawing Sheets

(56) References Cited

U.S. PATENT DOCUMENTS

| | | | |
|---|---|---|---|
| 8,200,983 B1* | 6/2012 | Victorov | G06F 21/125 713/187 |
| 8,250,655 B1* | 8/2012 | Malanov | G06F 21/564 713/165 |
| 8,488,061 B2* | 7/2013 | Radhakrishnan | G06K 9/00744 348/571 |
| 9,009,539 B1* | 4/2015 | Kompotis | G06F 11/3636 714/38.1 |
| 9,230,455 B2* | 1/2016 | Probert | G06F 21/125 |
| 2003/0065976 A1* | 4/2003 | Bennett | G06F 8/53 714/35 |
| 2005/0105761 A1* | 5/2005 | Zimmer | G06T 1/0035 382/100 |
| 2006/0136712 A1* | 6/2006 | Nagendra | G06F 9/45516 713/150 |
| 2006/0230453 A1* | 10/2006 | Flynn | G06F 21/125 726/24 |
| 2013/0097661 A1* | 4/2013 | Ma | H04L 63/145 726/1 |
| 2013/0160125 A1* | 6/2013 | Likhachev | G06F 21/564 726/24 |
| 2013/0166899 A1* | 6/2013 | Courtney | G06F 21/53 713/100 |
| 2014/0006375 A1* | 1/2014 | Forte | G06F 8/71 707/709 |
| 2014/0337639 A1* | 11/2014 | Probert | G06F 21/125 713/189 |
| 2015/0019857 A1* | 1/2015 | Adams | G06F 21/53 713/100 |
| 2015/0186648 A1* | 7/2015 | Lakhotia | G06F 21/563 726/22 |
| 2016/0371495 A1* | 12/2016 | Bhat | G06F 21/53 |
| 2017/0372068 A1* | 12/2017 | Zimmerman | G06F 21/563 |

* cited by examiner

DETERMINING THE SIMILARITY OF BINARY EXECUTABLES

RELATED APPLICATION

This application claims priority to U.S. Provisional Application No. 62/526,229 filed Jun. 28, 2017, the content of which is incorporated herein by reference in its entirety.

TECHNICAL FIELD

The disclosure generally relates to malware detection.

BACKGROUND

Computing devices (e.g., smartphones, tablet computers, smartwatches, etc.) are ubiquitous. Much of the functionality of computing devices comes from applications. Sometimes applications can include malicious instructions that can damage a user's device and/or files. To identify malicious applications, it is sometimes necessary to compare an unknown application to a known malicious application. If the applications are the same or similar enough, the unknown application can be identified as a malicious application. application user.

SUMMARY

In some implementations, a computing device can determine the similarity of binary executables. For example, the computing device can receive an application, including a binary executable. The computing device can generate function signatures for the functions called within the binary executable. The computing device can generate a locality sensitive hash value for the application based on the function signatures. The computing device can group applications based on the locality sensitive hash value generated for each application. The computing device can compare the function signatures of the binary executables of the applications within a group to determine the similarity of the applications. If two applications have binary executables that are over a threshold percentage of similarity, the two applications can be identified as clones of each other.

Particular implementations provide at least the following advantages. By generating a locality sensitive hash value (e.g., minimum hash value) for binary executables, grouping the executables based on the locality sensitive hash value, and comparing the executables within a group for similarity, the number of application executables that need to be compared to find cloned (e.g., similar or the same) applications can be reduced.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
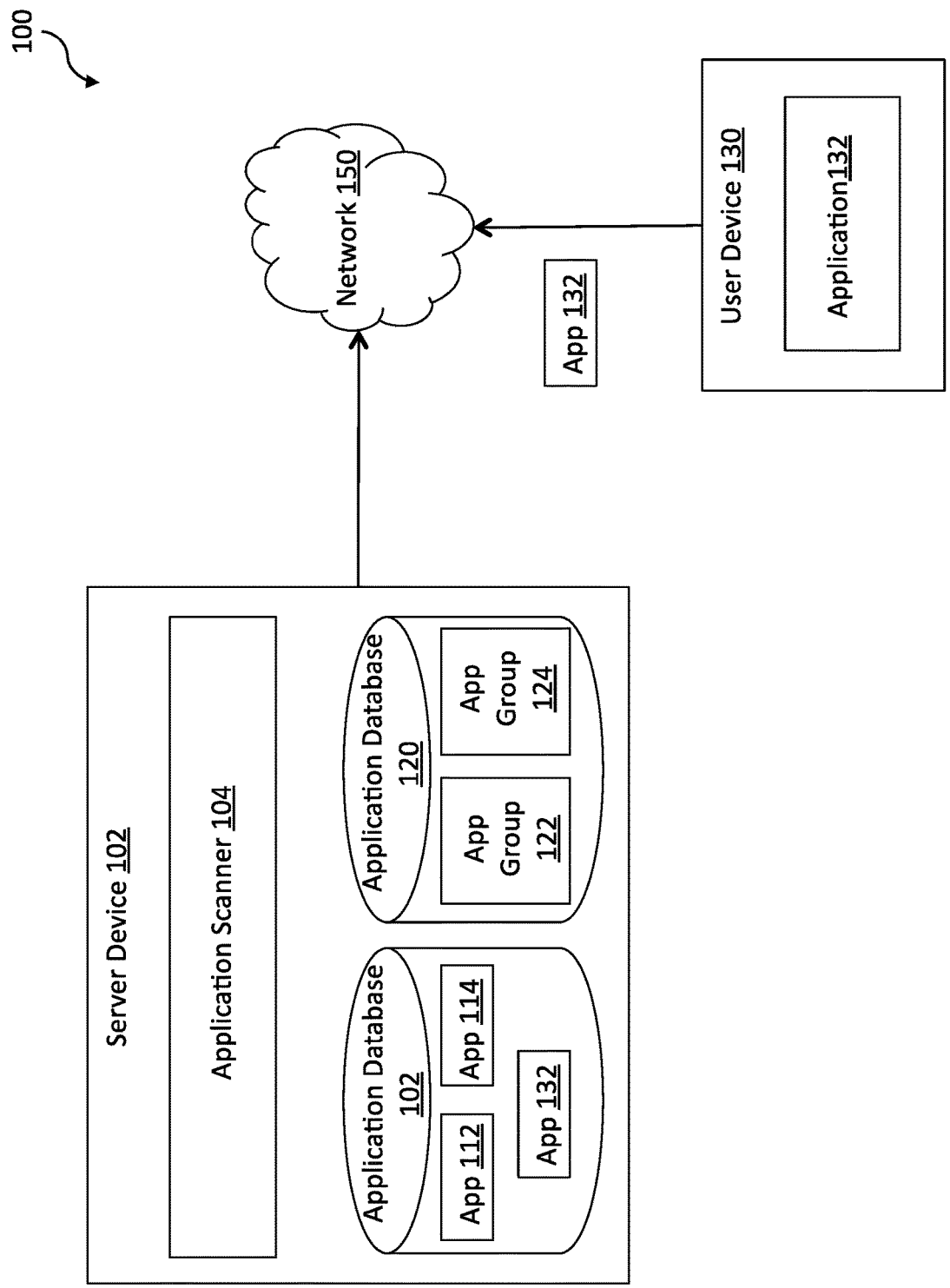
FIG. 1 is a block diagram of an example system for determining the similarity of binary executables.

FIG. 1 is a block diagram of an example system 100 for determining the similarity of binary executables. For example, system 100 can be configured to determine whether two or more binary executables for two or more applications are similar enough to be considered duplicates or clones of each other. System 100 generates signatures for functions called or defined within the executables, generates a minimum hash value that is used to group executables (i.e., applications) having similar functions, and performs a function level comparison of the executables within a group to determine whether clones or duplicates of an application executable exist within the group of executables (e.g., applications). Cloned applications can then be removed from system 100 or presented to a user for further processing.

In some implementations, system 100 can include server device 102. For example, server device 102 can represent a single server or multiple servers (e.g., in a server group, data processing center, etc.). Server device 102 can be a computing device that corresponds to one of many well-known computer architectures.

In some implementations, server device 102 can include application scanner 104. For example, application scanner 104 can be a software server, or multiple software servers, that provides a mechanism for comparing applications to determine whether a received application is the same or similar to a known malware application. Application scanner 104 can manage intake of new applications created by software developers. Application scanner 104 can, therefore, implement processes for determining when a received application is a clone or duplicate of a malware application.

In some implementations, server device 102 can include application database 110. For example, application database 110 can store applications (e.g., applications 112, 114, 132, etc.) that have been submitted to application scanner 104 by users. For example, when application scanner 104 receives a new application submission from an application user, application scanner 104 can store the new application in application database 110. An application (e.g., application 112, 114, 132, etc.) can be a package of data including, for example, resources (e.g., data files), icons, executable scripts, images, metadata, and/or a binary executable. For example, the binary executable can be a binary program that controls the behavior of the application and includes machine instructions (e.g., code) that determines the operations performed by the application. For example, two executables (e.g., applications) can be considered similar or identical when the instructions included in the binary executable for an application are similar or the same, as described further below.

In some implementations, server device 102 can include application signature database 120. For example, application signature database 120 can include application groups (e.g., application groups 122, 124). Application groups 122, 124 can include, for example, applications that have been grouped together based on the similarity of the function signatures of the applications in each group. For example, when application scanner 104 receives a new application, application scanner 104 can generate signatures for each function in the application's binary executable. Application scanner 104 can then group the new application with other applications that have similar function signatures. After grouping the applications, application scanner 104 can compare applications within an application group to determine which applications in the application group are duplicates or clones of each other. By limiting the comparison of applications to applications within an application group, application scanner 104 can reduce the number of applications that need to be compared to determine duplicates.

In some implementations, system 100 can include user device 130. For example, user device 130 can be any computing device that a user can use to submit a software application, such as software application 132, to application scanner 104. For example, user device 130 can establish a connection with application scanner 104 on server device 102 through network 150 (e.g., a local area network, Wi-Fi network, cellular data network, the Internet, or a combination thereof). Application scanner 104 can store application 132 in application database 110 and analyze application 132 to determine if application 132 is duplicative of any application (e.g., a malware application, a non-malware application, etc.) in application database 110. Application scanner 104 can use the application function signatures and/or application groups stored in application signature database 120 to determine whether application 132 is duplicative of other applications in application database 110, as described further below.

Figure 2:
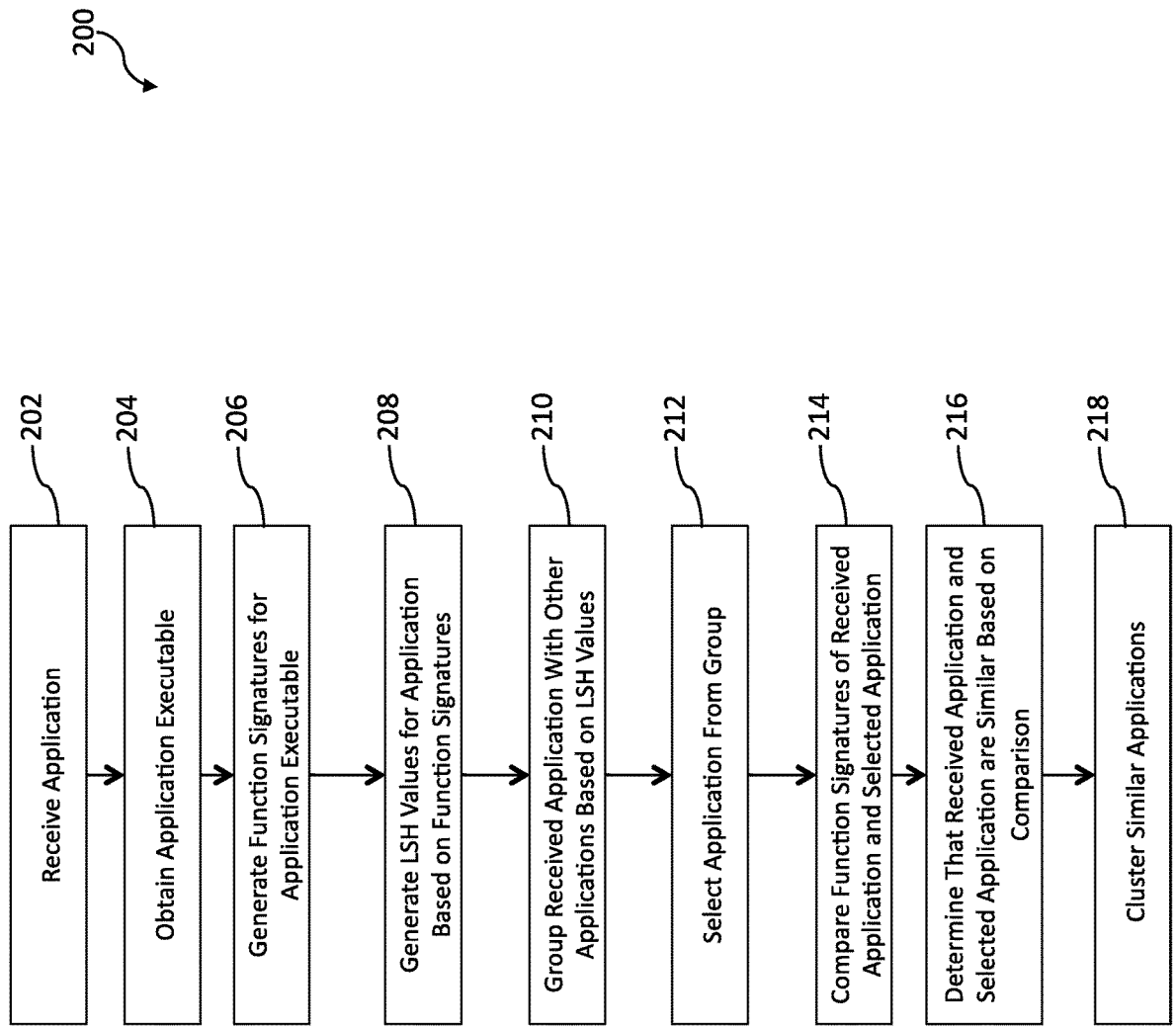
FIG. 2 is a flow diagram of an example process for determining whether a first application is similar to other applications.

FIG. 2 is a flow diagram of an example process 200 for determining whether a first application is similar to other applications. For example, process 200 can be performed by application scanner 104 to determine whether a received application is duplicative of (e.g., a clone or substantially similar to) other applications already received by application scanner 104.

At step 202, server device 102 can receive an application. For example, application scanner 104 can receive application 132 from user device 130 through network 150. User device 130 can submit application 132 to application scanner 104 so that application 132 can be analyzed by application scanner 104 to determine whether application 132 is similar to or the same as known malware applications. This analysis can determine whether application 132 is duplicative of other applications (e.g., applications 112, 114), including malware applications, that have been previously submitted to application scanner 104. In some implementations, the application can include an application package that includes, among other things, a binary executable corresponding to the application.

At step 204, server device 102 can obtain the binary executable for the application. For example, application scanner 104 can obtain the binary executable for the application from the application package corresponding to application 132, as described above.

At step 206, server device 102 can generate function signatures for the binary executable. For example, application scanner 104 can generate a function signature (e.g., hash value) according to the steps of process 400 described below. Application scanner 104 can generate a function signature for each function called within the binary executable of application 132.

At step 208, server device 102 can generate a locality sensitive hash value for the received application based on the function signatures generated for the received application. For example, application scanner 104 can perform a locality sensitive hash (LSH) function (e.g., MinHash) to generate an LSH value (e.g., hash value, signature, index, etc.). For example, the LSH function can take the function signatures of a binary executable as input and generate the LSH value based on the function signatures. When application scanner 104 performs the hash function on two different binary executables that are similar (e.g., have similar function signatures), the locality sensitive hash function can generate the same or similar LSH values for both applications.

At step 210, server device 102 can group the received application with other applications based on the LSH value. For example, as application scanner 104 receives applications from application users, application scanner 104 can generate LSH values for the received applications. Since application scanner 104 will generate the same or similar LSH values for functionally similar applications, application scanner 104 can group functionally similar application based on the LSH value. Thus, when application scanner 104 generates an LSH value for the application received at step 202, application scanner 104 can group the received application with other application that are functionally similar using the LSH value generated for the received application.

Figure 3A:
FIG. 3A is a diagram illustrating of two applications having similar function signatures.
Figure 3A:
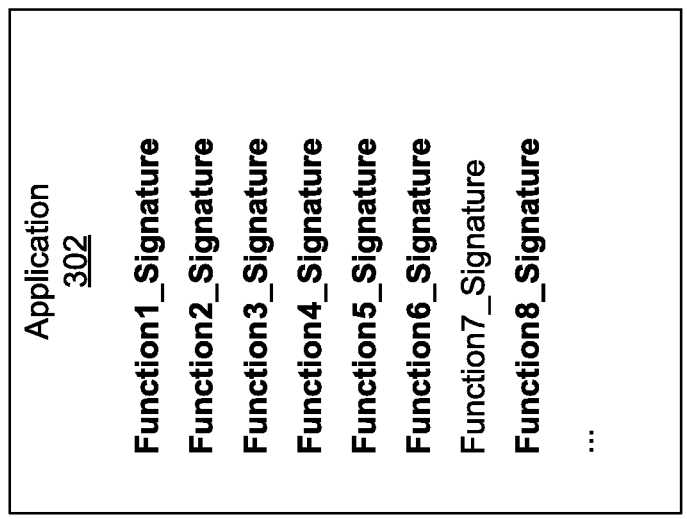
Figure 3B:
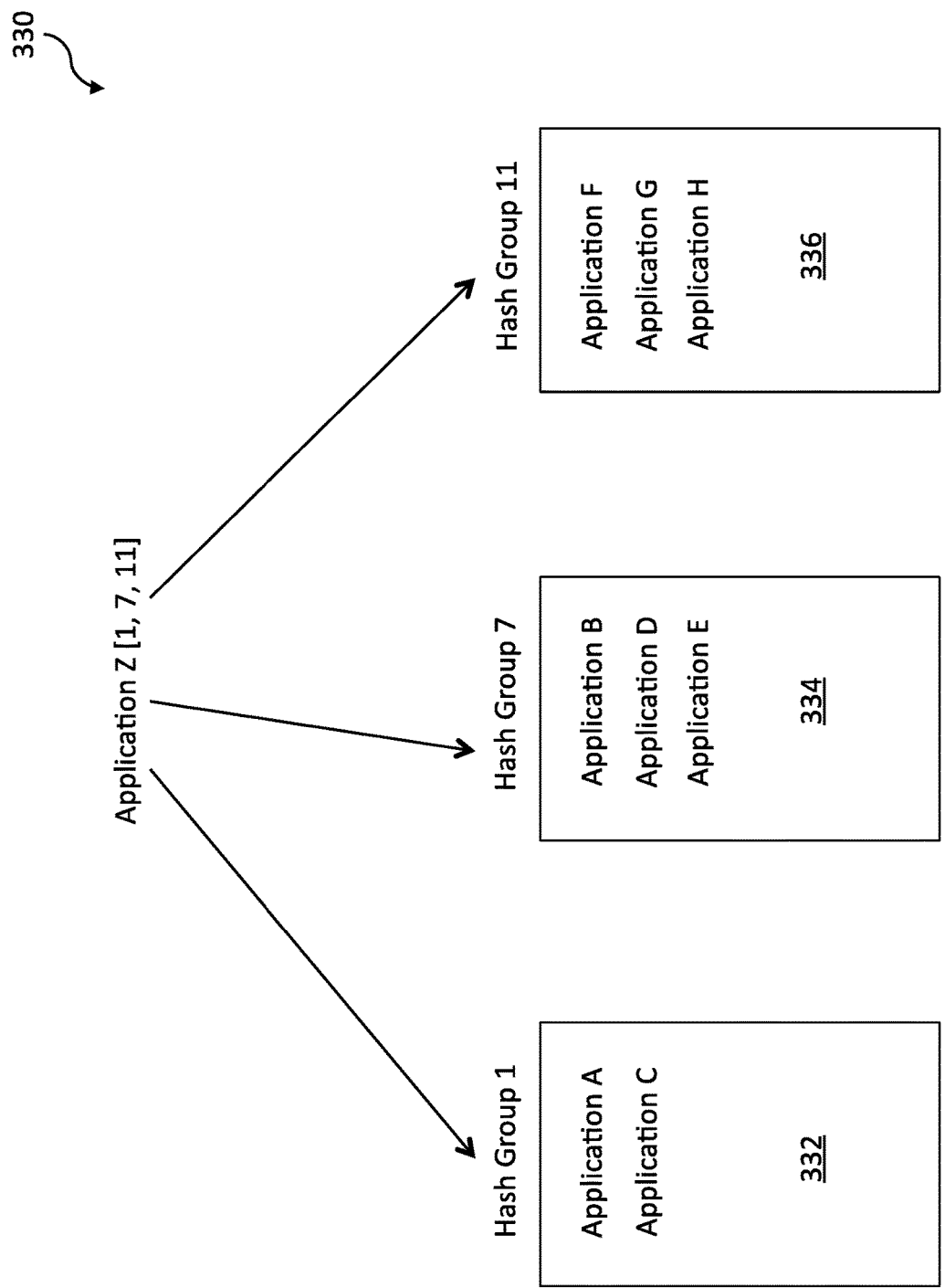
FIG. 3B is a diagram illustrating an example of grouping applications based on LSH values.

FIG. 3B is a diagram 330 illustrating an example of grouping applications based on LSH values. For example, when application scanner 104 receives an application from user device 130, application scanner 104 can generate function signatures for the received application. Application scanner 104 can then provide the function signatures to the locality sensitive hash function. The locality sensitive hash function can generate LSH values based on the function signatures. For example, the locality sensitive hash function can generate three, four, ten, fifty or more LSH values for each application received by application scanner 104.

In some implementations, application scanner 104 can generate and/or maintain application groups corresponding to each LSH value generated for the applications received by application scanner 104. For example, each application group (e.g., hash group) can correspond to a respective LSH value. For example, hash group 332 can correspond to the LSH value 1, hash group 334 can correspond to LSH value 7, hash group 336 can correspond to LSH value 11. When application scanner 104 receives an application for which application scanner 104 generates the LSH value 1, application scanner 104 can add the application to hash group 332. Similarly, when application scanner 104 receives an application for which application scanner 104 generates the LSH value 7, application scanner 104 can add the application to hash group 334. When application scanner 104 receives an application for which application scanner 104 generates the LSH value 11, application scanner 104 can add the application to hash group 336. Thus, an application will be added to the hash group corresponding to one of the LSH values generated for the application.

In some implementations, application scanner 104 can generate a comparison group for performing function-wise comparisons of applications. For example, when application scanner 104 receives an application, application scanner 104 can generate LSH values for the received application, as described above. To generate the comparison group for the received application, application scanner can combine the hash groups (e.g., application groups) corresponding to the LSH values generated for the received application. For example, when application scanner 104 receives application Z, application scanner 104 can generate LSH values 1, 7, and 11 for application Z. Application scanner can then combine (e.g., union) the hash groups 332, 334, and/or 336 corresponding to the generated LSH values to generate the comparison group. Application scanner 104 can then perform a function-wise comparison of application Z with each of the other applications in the comparison group to determine whether application Z is similar enough to be considered the same application as any of the other applications in the comparison group, as described further below.

Grouping applications based on the LSH value can serve as a filter to reduce the number of applications that application scanner 104 will have to compare at steps 212-216 below. For example, application scanner 104 may only perform a function-wise comparison of application executables (e.g., steps 212-216) within the same comparison group. As described above, applications within the same comparison group have already been determined to have some level of similarity as determined using the locality sensitive hash function and resulting LSH value and, therefore, application scanner 104 does not need to waste time and resources comparing applications that are not similar to the received application.

In some implementations, application scanner 104 can store the application groups (e.g., application group 122, application group 124, hash groups 332, 334, 336, etc.) in application signature database 120. Application scanner database 120 can store application groups indexed, referenced by, or mapped to the LSH value for the application group. Each application in an application group can include an application identifier, the binary executable for the application, and the function signatures for the application. Thus, application scanner 104 can regenerate LSH values for applications and perform comparisons of function signatures between applications in an application group based on the application data stored in application signature database 120.

At step 212, server device 102 can select an application from the comparison group. For example, application scanner 104 can select an application from the comparison group generated for the received application. Application scanner 104 can select an application that has not been previously compared to the received application. For example, steps 212-216 can be performed iteratively (e.g., in a loop, repeatedly) to compare the received application with each of the other applications in the comparison group to determine whether the received application is duplicative (e.g., a copy, clone, very similar) to applications in the comparison group.

At step 214, server device 102 can compare the function signatures of the received application and the selected application. For example, application scanner 104 can compare the function signatures by determining the Jaccard similarity between the function signatures of the received application and the function signatures of the selected application. To determine the Jaccard similarity, application scanner 104 can calculate the Jaccard similarity coefficient for the function signatures of the selected application (set A) and the function signatures of the received application (set B). The Jaccard similarity coefficient for sets A and B is defined to be the ratio of the number of elements of their intersection and the number of elements of their union, as represented by equation 1 below. When the Jaccard similarity coefficient is zero, the two sets A and B are completely different. When the Jaccard similarity coefficient is one, the two sets A and B are identical. Jaccard coefficient values between zero and one indicate how similar the sets A and B are where sets that generate a value closer to one are more similar.

$$J(A,B)=|A\cap B|/|A\cup B| \quad (1)$$

FIG. 3A is an diagram 300 illustrating two example applications having similar function signatures. For example, diagram 300 includes application 302 and application 304. Application 302 can correspond to the application received at step 202 of process 200, for example. Application 304 can correspond to an application selected from an application group at step 212. As illustrated by FIG. 3A, each application 302 and application 204 has several function signatures in common (in bold) and a few function signatures that are different (not bold). To determine the Jaccard similarity coefficient for these two applications, application scanner 104 can calculate the ratio of the number of function signatures in common between the two applications over the total number of unique function signatures. In the example of FIG. 3A, application 302 and application 304 have 7 function signatures in common and there are 9 unique function signatures total. Thus, the Jaccard similarity coefficient for these two applications is 7/9 or 0.78.

Returning to process 200 of FIG. 2, at step 216, server device 102 can determine that the received application and the selected application are similar enough to be considered the same application based on the comparison. For example, application scanner 104 can determine that the received application and the selected application are similar enough to be considered the same (e.g., duplicates, clones, etc.) application when the Jaccard similarity coefficient calculated for the two applications is above a threshold value (e.g., 0.95, 0.8, etc.). If additional applications in the application group remain unselected, application scanner 104 can select the next application in the comparison group at step 212. If no additional unselected application remains in the comparison group, process 200 can continue to step 218.

At step 218, server device 102 can cluster similar applications. For example, applications previously received by application scanner 104 may be clustered based on Jaccard similarity. When a first application and a second application have a Jaccard similarity that is above a threshold value, the first application and second application can be clustered into a group of similar applications. However, if the second application is already a member of a cluster, the second application's cluster can be included in the cluster for the first application. This clustering mechanism is illustrated by FIG. 3C.

Figure 3C:
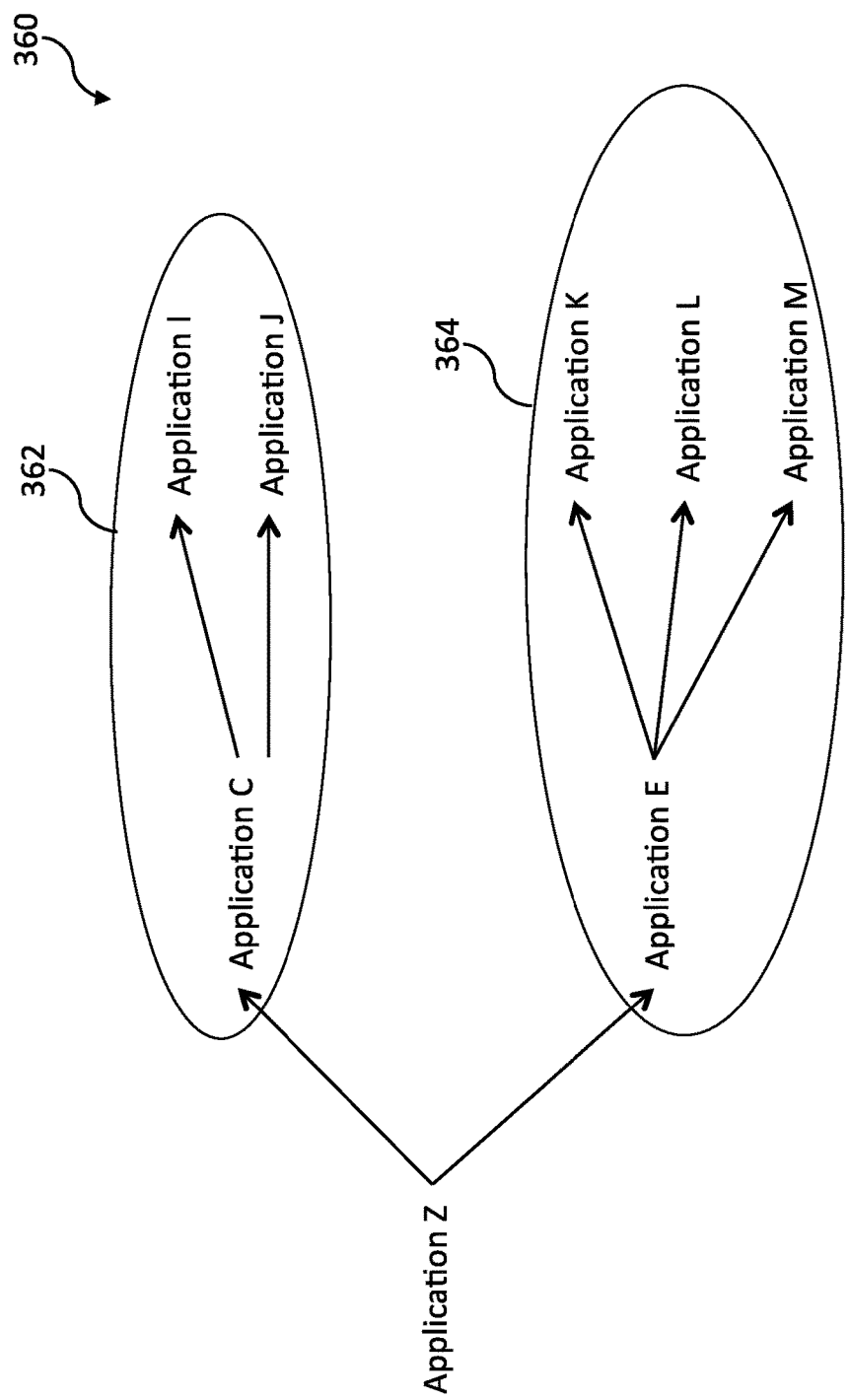
FIG. 3C is a diagram illustrating clustering similar applications.

FIG. 3C is a diagram 360 illustrating clustering similar applications. For example, when application scanner 104 determines that application Z is similar to application C and application E using the Jaccard similarity calculated for applications Z and C, and applications Z and E, application scanner 104 can cluster applications Z, C, and E into the same cluster or group. Applications within the same cluster have been determined to be similar enough to be considered the same application (e.g., clones, duplicates, etc.). However, when application C was previously received by application scanner 104, application scanner 104 clustered application C with application I and application J in cluster 362. Similarly, when application E was previously received by application scanner 104, application scanner 104 clustered application E with applications K, L, and M in cluster 364. Application clusters 362 and 364 can be stored so that these clusters of similar applications can be presented to a user and/or combined with other application clusters. For example, when application scanner 104 determines that applications Z, C, and E are similar enough to be considered the same application based on the Jaccard similarity calculated for the applications, application scanner 104 can cluster applications Z, C, and E. Further, since applications C and E belong to clusters 362 and 364, respectively, application scanner 104 can include clusters 362 and 364 in the application cluster that includes Z, C, and E. Thus, the application cluster generated for application Z can include applications C, E, I, J, K, L, and M. Each application in the application cluster for application Z can be considered the same application as application Z.

In some implementations, when application scanner 104 determines that two applications are similar enough to be considered the same, application scanner 104 can prevent the received application from being distributed through application scanner 104. For example, when application scanner 104 determines that the received application is similar to a known malware application (e.g., is in the same application cluster as a malware application), application scanner 104 can automatically delete the received application. When application scanner 104 determines that the received application is similar to a known malware application (e.g., is in the same application cluster as a malware application), application scanner 104 can automatically mark the received application with a flag or some data in application database 110 indicating that the received application should not be distributed by application scanner 104.

In some implementations, when application scanner 104 determines that two applications are the similar enough to be considered the same (e.g., the applications are in the same application cluster), application scanner 104 can present information identifying applications that are duplicates or clones. For example, application scanner 104 may have a user administrator that reviews applications submitted to application scanner 104 and who serves as the arbiter for determining which applications are malicious and which are not. When application scanner 104 determines that two applications are the same (e.g., the applications are within the same application cluster), application scanner 104 can present a graphical user interface that identifies duplicative applications. The application scanner administrator can then determine whether to allow the duplicative applications to be distributed through application scanner 104 or whether to delete the duplicative application(s).

In some cases, application scanner 104 can determine automatically without administrator providing a decision as to whether the received application is a malware application.

Figure 4:
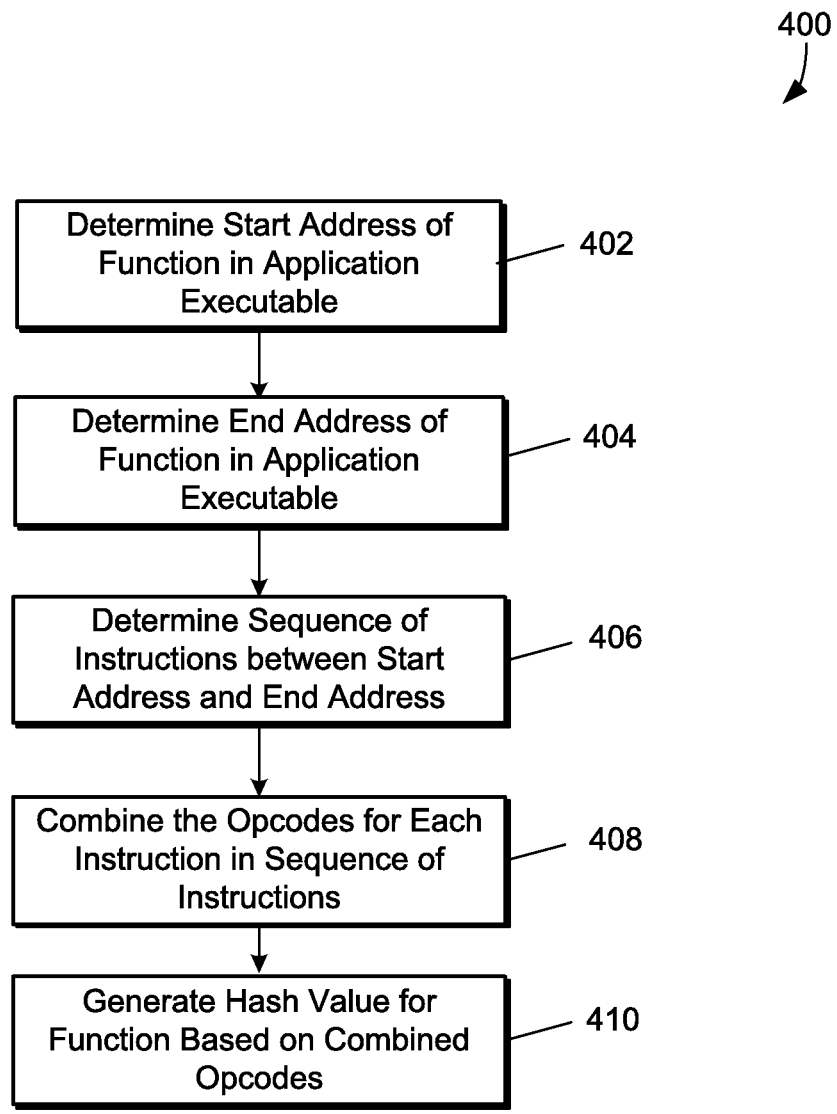
FIG. 4 is a flow diagram of an example process for generating a function signature.

FIG. 4 is a flow diagram of an example process 400 for generating a function signature. For example, process 400 can be performed by application scanner 104 at step 206 of process 200 described above.

At step 402, server device 102 can determine the start address of a function in an application binary executable. For example, the application binary executable can correspond to the application received at step 202 of process 200 described above. The start address can be determined based on data included in the header of the application binary executable, as illustrated by FIG. 5.

Figure 5:
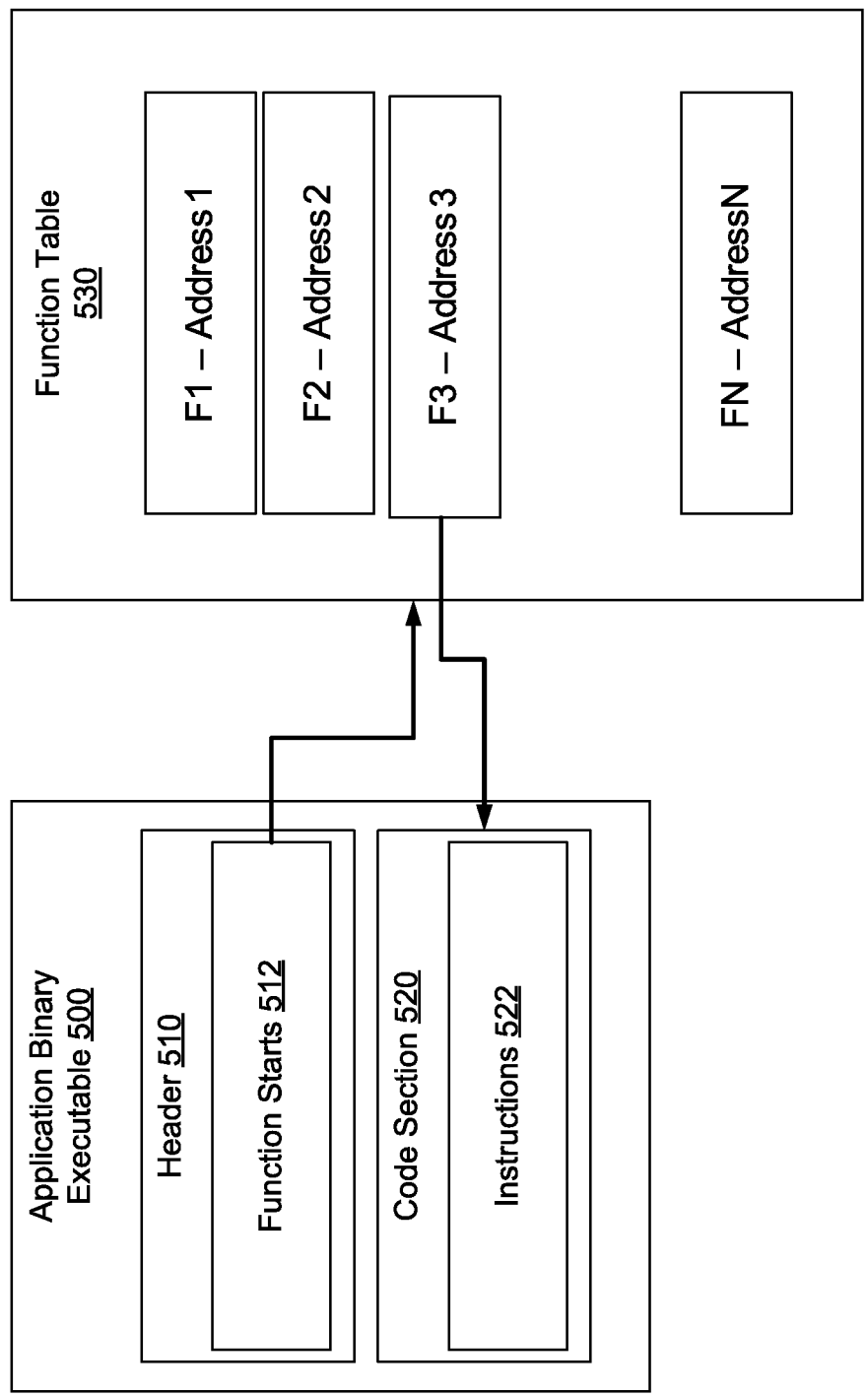
FIG. 5 is a block diagram of a binary executable.

FIG. 5 is a block diagram of a binary executable 500. For example, executable 500 can correspond to the binary executable received at step 202 of process 200, described above.

In some implementations, executable 500 can include header 510. Header 510 can include information describing various aspects of executable 500. Header 510 can include function starts pointer 512, for example. Application scanner 104 can use function starts pointer 512 to obtain function table 530 that includes entries mapping function identifiers to starting addresses in code section 520 that contains instructions 522 for performing the corresponding function.

When generating function signatures for functions within executable 500, application scanner 104 can determine the starting location of a function (e.g., function F1) within code section 520 based on the corresponding start address identified in function table 530. Similarly, application scanner 104 can determine the end location of a function (e.g., function F1) by determining the start address of the next function (e.g., function F2) in function table 530. The instructions (e.g., instructions 522) that are between the start location and the end location of the function in code section 520 define the function and can be used by application scanner 104 to generate a signature for the function. For example, the instructions 522 can include individual instructions (e.g., assembly code, assembly instructions, etc.) that each specify an operation (e.g., an operation code, opcode, instruction syllable, etc.) and an operand (e.g., opcode parameter). Application scanner 104 can generate a function signature based on these operations (e.g., opcodes), as described further below with reference to process 400 of FIG. 4.

Returning to FIG. 4, at step 404, server device 102 can determine an end address of the function in the application executable. For example, application scanner 104 can determine the ending address of the instructions for a function based on the information in the executable header and function table, as described above with reference to FIG. 5.

At step 406, server device 102 can determine a sequence of instructions between the start address of the function and the end address of the function. As described above with reference to FIG. 5, application scanner 104 can determine the operations (e.g., opcodes) for the instructions included between the start address and the end address of the function in code section 520.

At step 408, server device 102 can combine the opcodes for each instruction in the sequence of instructions for the function. For example, application scanner 104 can concatenate the opcodes for the instructions between the start address and the end address for the function according to the order in which the instructions would be performed. The opcodes can be concatenated into a string, for example.

At step 410, server device 102 can generate a hash value for the function based on the combined opcodes. For example, application scanner 104 can provide the concatenated opcode string as input to a hash function (e.g., SHA256 hash function). The hash function can generate a hash value based on the concatenated opcode string. Application scanner 104 can store and/or use the hash value as the signature for the function.

To enable the reader to obtain a clear understanding of the technological concepts described herein, the above processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes above may omit or briefly summarize some of the details of the technologies disclosed herein for clarity, the details described in the paragraphs above may be combined with the process steps described above to get a more complete and comprehensive understanding of these processes and the technologies disclosed herein.

Example System Architecture

Figure 6:
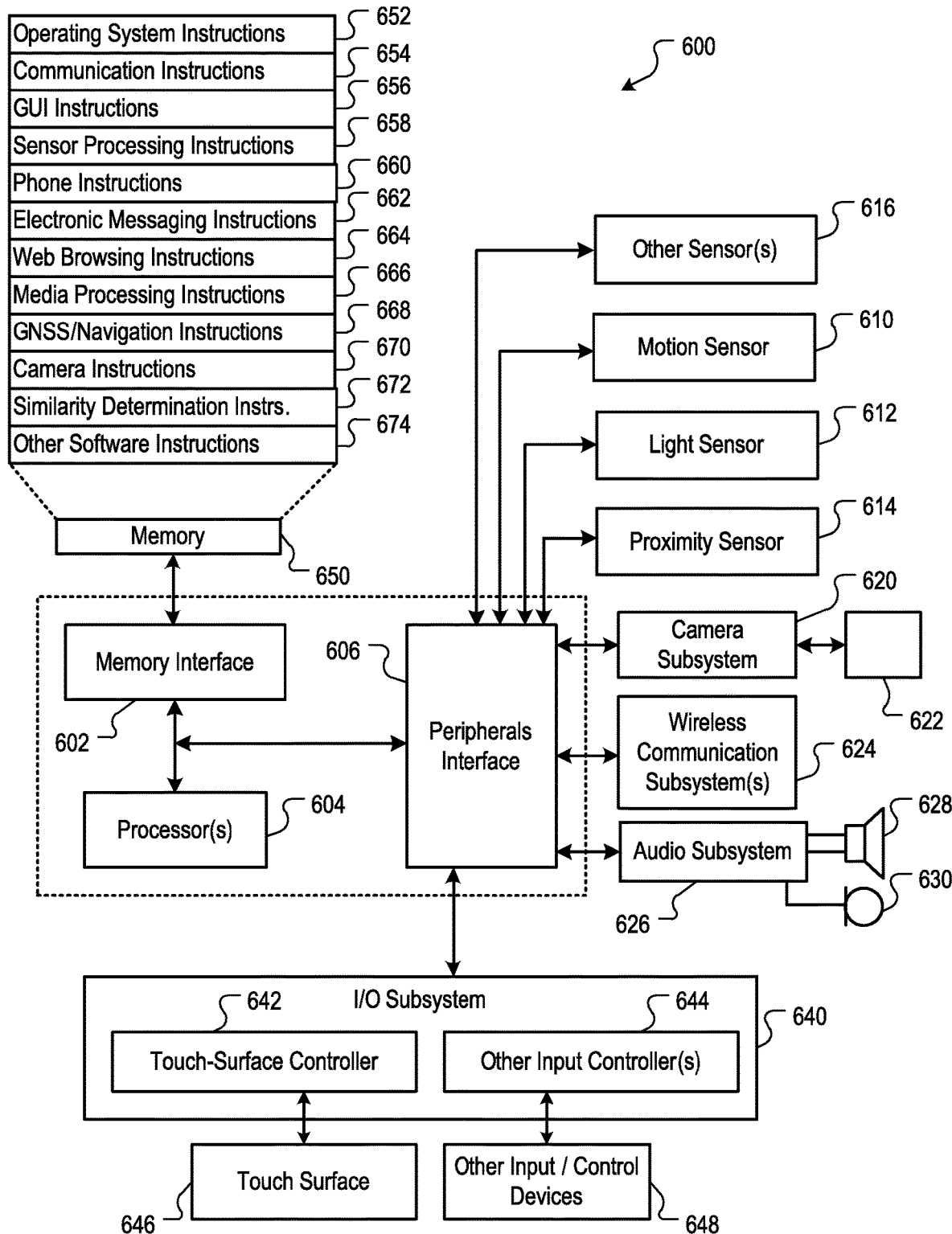
FIG. 6 is a block diagram of an example computing device that can implement the features and processes of FIGS. 1-5.

FIG. 6 is a block diagram of an example computing device 600 that can implement the features and processes of FIGS. 1-5. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voiceprinting and voice authentication, for example.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™. The computing device 600 can, therefore, include a 36-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement the executable similarity determination features as described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store other software instructions 672 to facilitate other processes and functions, such as the executable similarity determination processes and functions as described with reference to FIGS. 1-5.

The memory 650 can also store other software instructions 674, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

What is claimed is:

1. A method comprising:
receiving, by a computing device, an application executable;
generating, by the computing device, one or more first function signatures for functions called within the application executable;
generating, by the computing device, a first value for the application executable based on the one or more first function signatures;
grouping, by the computing device, the received application executable with one or more other application executables into an application group based on the first value;
comparing, by the computing device, the received application executable to the one or more other application executables in the application group; and
determining, by the computing device, based upon the comparing, that the received application executable and at least one of the one or more other application executables are functionally the same application executable.

2. The method of claim 1, wherein generating function signatures includes:
determining opcodes within the application executable corresponding to a particular function;
combining the opcodes to generate a string of opcodes; and
generating a hash value based on the string of opcodes.

3. The method of claim 1, wherein the first value is a locality sensitive hash value that is generated by performing a minimum hash function.

4. The method of claim 1, wherein each application executable in the application group corresponds to the same first value.

5. The method of claim 1, wherein comparing the received application executable to the one or more other applications in the application group includes generating a Jaccard coefficient based on a first set of function signatures corresponding to the received application executable and a second set of function signatures corresponding to a selected application executable selected from the application group.

6. The method of claim 5, further comprising:
determining whether the Jaccard coefficient is above a threshold value; and
determining that the received application executable and the at least one of the one or more other application executables are functionally the same application executable when the Jaccard coefficient is above the threshold value.

7. The method of claim 1, further comprising:
generating a graphical user interface that identifies application executables that are functionally the same;
causing the graphical user interface to be presented by a client device; and
allowing selection and deletion of one or more functionally similar application executables.

8. A non-transitory computer readable medium including one or more sequences of instructions that, when executed by one or more processors, causes the processors to perform operations comprising:
receiving, by a computing device, an application executable;
generating, by the computing device, one or more first function signatures for functions called within the application executable;
generating, by the computing device, a first value for the application executable based on the one or more first function signatures;
grouping, by the computing device, the received application executable with one or more other application executables into an application group based on the first value;
comparing, by the computing device, the received application executable to the one or more other application executables in the application group; and
determining, by the computing device, based upon the comparing, that the received application executable and at least one of the one or more other application executables are functionally the same application executable.

9. The non-transitory computer readable medium of claim 8, wherein the instructions that cause generating function signatures include instructions that cause:
determining opcodes within the application executable corresponding to a particular function;
combining the opcodes to generate a string of opcodes; and
generating a hash value based on the string of opcodes.

10. The non-transitory computer readable medium of claim 8, wherein the first value is a locality sensitive hash value that is generated by performing a minimum hash function.

11. The non-transitory computer readable medium of claim 8, wherein each application executable in the application group corresponds to the same first value.

12. The non-transitory computer readable medium of claim 8, wherein the instructions that cause comparing the received application executable to the one or more other applications in the application group include instructions that cause generating a Jaccard coefficient based on a first set of function signatures corresponding to the received application executable and a second set of function signatures corresponding to a selected application executable selected from the application group.

13. The non-transitory computer readable medium of claim 12, wherein the instructions cause the processors to perform operations comprising:
determining whether the Jaccard coefficient is above a threshold value; and
determining that the received application executable and the at least one of the one or more other application executables are functionally the same application executable when the Jaccard coefficient is above the threshold value.

14. The non-transitory computer readable medium of claim 8, wherein the instructions cause the processors to perform operations comprising:
generating a graphical user interface that identifies applications that are functionally the same; and
causing the graphical user interface to be presented by a client device.

15. The non-transitory computer readable medium of claim 8, wherein each application executable in the application group corresponds to the same locality sensitive hash value.

16. A system comprising:
one or more processors; and
a non-transitory computer readable medium including one or more sequences of instructions that, when executed by the one or more processors, causes the processors to perform operations comprising:
- receiving, by a computing device, an application executable;
- generating, by the computing device, one or more first function signatures for functions called within the application executable;
- generating, by the computing device, a first value for the application executable based on the one or more first function signatures;
- grouping, by the computing device, the received application executable with one or more other application executables into an application group based on the first value;
- comparing, by the computing device, the received application executable to the one or more other application executables in the application group; and
- determining, by the computing device, based upon the comparing, that the received application executable and at least one of the one or more other application executables are functionally the same application executable.

17. The system of claim 16, wherein the instructions that cause generating function signatures include instructions that cause:
- determining opcodes within the application executable corresponding to a particular function;
- combining the opcodes to generate a string of opcodes; and
- generating a hash value based on the string of opcodes.

18. The system of claim 16, wherein the first value is a locality sensitive hash value that is generated by performing a minimum hash function.

19. The system of claim 16, wherein the instructions that cause comparing the received application executable to the one or more other applications in the application group include instructions that cause generating a Jaccard coefficient based on a first set of function signatures corresponding to the received application executable and a second set of function signatures corresponding to a selected application executable selected from the application group.

20. The system of claim 19, wherein the instructions cause the processors to perform operations comprising:
- determining whether the Jaccard coefficient is above a threshold value; and
- determining that the received application executable and the at least one of the one or more other application executables are functionally the same application executable when the Jaccard coefficient is above the threshold value.

21. The system of claim 16, wherein the instructions cause the processors to perform operations comprising:
- generating a graphical user interface that identifies application executables that are functionally the same; and
- causing the graphical user interface to be presented by a client device.

* * * * *